Jan. 31, 1967  F. R. GRUNER  3,301,025
LAUNDRY MACHINE

Filed July 13, 1965  2 Sheets-Sheet 1

INVENTOR
FREDERICK R. GRUNER
BY
ATTORNEYS

Jan. 31, 1967   F. R. GRUNER   3,301,025
LAUNDRY MACHINE

Filed July 13, 1965   2 Sheets-Sheet 2

INVENTOR
FREDERICK R. GRUNER
BY
ATTORNEYS

United States Patent Office 3,301,025
Patented Jan. 31, 1967

3,301,025
LAUNDRY MACHINE
Frederick R. Gruner, Moline, Ill., assignor to Ametek, Inc., New York, N.Y., a corporation of Delaware
Filed July 13, 1965, Ser. No. 471,655
6 Claims. (Cl. 68—12)

This invention relates to program control devices for laundry machines, and particularly to an improved apparatus having the capability of utilizing interchangeable programs with facility.

Interchangeable program means for laundry machines are old. Known devices of this type often include radially extending ribs peripherally disposed about a program drum, said ribs being in line with switches in the control circuit of the laundry machine. When a switch is to be actuated, a peripheral portion of the radially extending rib is removed. Also, sheets of flexible material have been wrapped around a conducting drum surface. These sheets often include elongated slots in line with switches to be actuated. When the contact of a switch encounters a slot, it contacts the conducting drum surface and completes an electrical circuit. In using a punched thin sheet of insulating material on a conducting drum, the current flows through the finger contact. Thus, either current flows or does not flow, and only one component of the machine can be controlled, unless other components are simultaneously energized and de-energized with the controlled component, or a relay is employed.

Limit switches may include plural contacts, some of which close and some of which open in each position of the switch actuator. This makes it possible to control more than one component simultaneously where current flows to one and is cut off from another.

The principal object of this invention is to provide a program control for a laundry machine in which the advantages of a thin sheet of punched insulating material for the program can be obtained while still achieving the advantages inherent in limit switches.

Another object of the invention is to provide such a program control for a laundry machine including a relatively thin sheet of material that has a program of elongated slots therein which will provide a substantial movement of a switch lever whenever a follower thereon encounters such a slot.

Another object of the invention is to provide such a program control that cooperates with a time-controlled rotatable drum to effect actuation of switches within the control circuit for the laundry machine.

Still another object of the invention is to provide such a program control in which no relays are required to render effective the current and voltages required for laundry machines.

The principles of the invention will be described as applied to a laundry machine including a laundry receiving drum that is mounted within a housing for rotation about a horizontal axis, although, obviously, the type of laundry machine may be varied in construction. The drum may be mounted on a horizontal, hollow shaft, including spray jet nozzles therealong, that extends to the exterior of the housing, and to which shaft a pulley may be fixed that is belted to a pulley on a high extract speed motor on the exterior of the housing.

In one aspect of the invention, a reversing motor may be mounted on the exterior of the housing and it may drive the drum at a slow reversing speed through a speed reduction unit that is belt-connected to the armature of the high speed motor.

The usual hot and cold water inlet connections may be provided for admitting hot and/or cold water as well as steam (if desired) through the axis of the hollow shaft supporting the drum. Further, a motor driven exhaust fan may be connected to the housing for removing vapors generated during the laundry cycle, and a solenoid operated dump valve may be provided for draining water from the drum.

In still another aspect of the invention, all of the above components as well as others are required to be actuated in a preselected sequence to produce the desired laundry cycle. Accordingly, they are all wired into an electrical control circuit.

In a further aspect of the invention, a controller may be provided for the control circuit which is capable of energizing the various circuits in sequence without the necessity of intermediate relays.

In a still further aspect of the invention, the controller may comprise a drum having axially spaced, circumferentially extending grooves. The drum may be a hollow cylinder of sufficient wall thickness to form grooves of adequate depth, or it may be made up of alternating discs of two different diameters. This latter arrangement makes it possible to alter the number of grooves and switches with facility to meet the requirements.

In another aspect of the invention, parallel spaced rods may be located above the drum, and bars having semi-cylindrical, transverse grooves in the ends thereof may be located in spaced relation between said rods.

In a further aspect of the invention, limit switches, such as those known in the trade as "microswitches," may be mounted on each of the bars in position such that the actuating lever thereof extends downwardly into one of the grooves of the drum. In this way, the bars supporting the switches may be reversed so as to provide a lefthand control unit. The plurality of switches may be connected to the various components previously described.

In a still further aspect of the invention, a relatively thin sheet of plastic may be provided that may be continuous or otherwise, and is adapted to fit snugly about the grooved drum. A program of elongated slots may be punched or cut in the plastic film in position relative to each other so as to sequentially operate the switches as the drum rotates to cause the proper functioning of the laundry machine.

The above, other objects and novel features of the improved controller for laundry machines will become apparent from the following specification and accompanying drawings which are merely exemplary.

Figure 1:
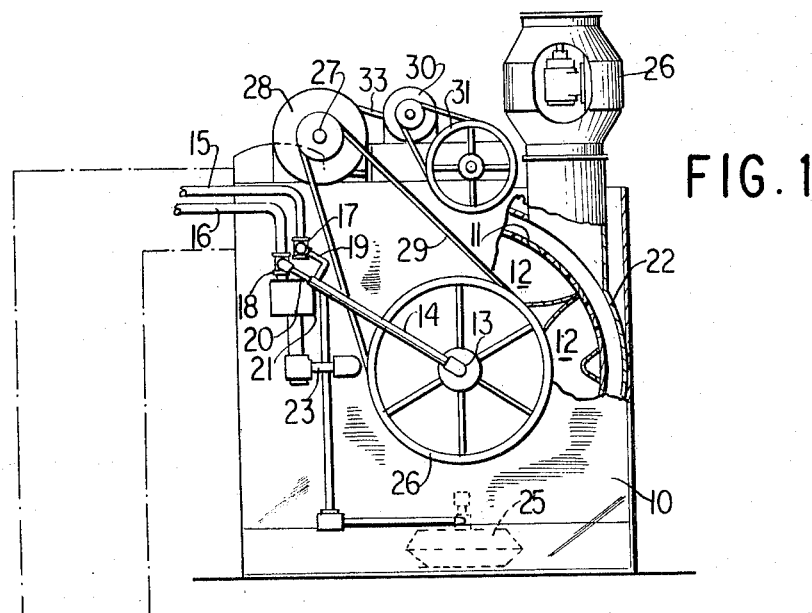
FIG. 1 is an elevational back view of a laundry machine to which the controller of the present invention has been applied.

Referring to the drawings, and particularly to FIG. 1, the principles of the invention are shown as applied to a laundry machine including a housing 10 within which is supported a drum or basket 11 having compartments 12 for receiving laundry. The basket 11 is fixed to a shaft 13 that is hollow and closed at the end inside basket 11. Radial passages (not shown) are provided in the shaft for spraying hot and/or cold water or steam onto the mass of laundry within basket 11. The end of shaft 13 outside the housing 10 is connected, through a rotatable seal, to a line 14 leading to hot and cold water lines 15, 16. Solenoid operated valves 17 and 18 in lines 19 and 20 leading from lines 15, 16 to line 14 control the flow of hot and cold water to line 14.

Lines 15 and 16 connect to a mixer 21 that is controlled also by solenoid valves, thence to the interior of a casing 22 surrounding drum or basket 11 within housing 10 via line 23.

A solenoid operated dump valve 25 is provided for emptying the water from casing 22, and a motor driven exhaust fan 26 exhausts vapor from housing 10.

The hollow shaft 13 is fixed to a pulley 26 that is connected to the output shaft 27 of a motor 28 through a belt 29. The motor drives the basket 11 at a rapid spin speed. Another motor 30, which is a reversing motor, is belt-connected to the input pulley 31 of a speed reducer 32, the output of which is belted to the armature of motor 28 by a belt 33. This drive provides the slow washing speed, both forward and reverse, of basket 11.

All of the above described components must be operated in sequential order by the closing and/or opening of contacts of electrical switches. Since certain of the components are simultaneously energized and de-energized, relays would be required if they are to be controlled by a single finger contact on a conducting drum.

Figure 2:
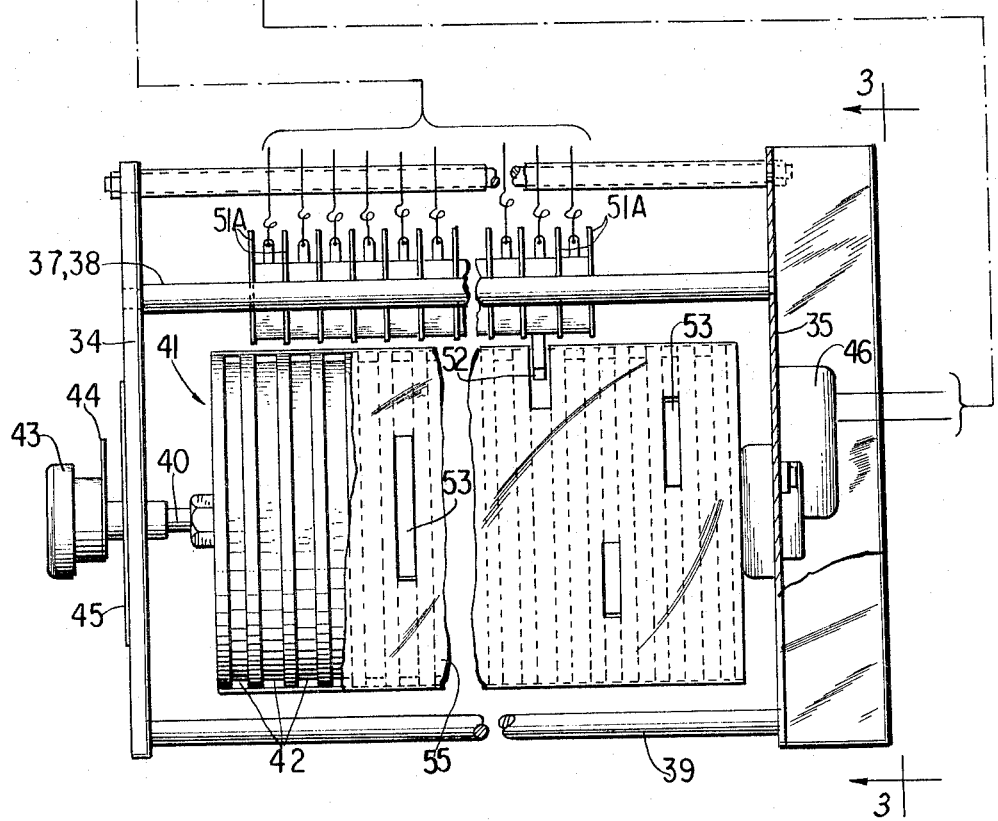
FIG. 2 is a view of the controller to which the principles of the invention have been applied.

Referring to FIG. 2, the controller of the present invention is disclosed. It may comprise plates 34 and 35 that are held in spaced relation by bars 36, 37, 38 and 39. A shaft 40 may be journaled in aligned bearings in plates 34, 35, and the shaft may have fixed to it a drum 41 having a plurality of axially spaced, circumferentially extending grooves 42 therealong. While the drum 41 is shown as having a solid peripheral surface that has been grooved, it could, of course, be made up of alternate discs of two different diameters. The drum shaft 40 on the outside of plate 34 may have a knob 43 fixed thereto and a pointer 44 that cooperates with a dial 45 indicating the point of the cycle that is effective. This permits manual control of the machine. The opposite end of shaft 40, on the outside of plate 35, may be connected to a timer motor 46 that is supplied with line voltage.

Figure 3:
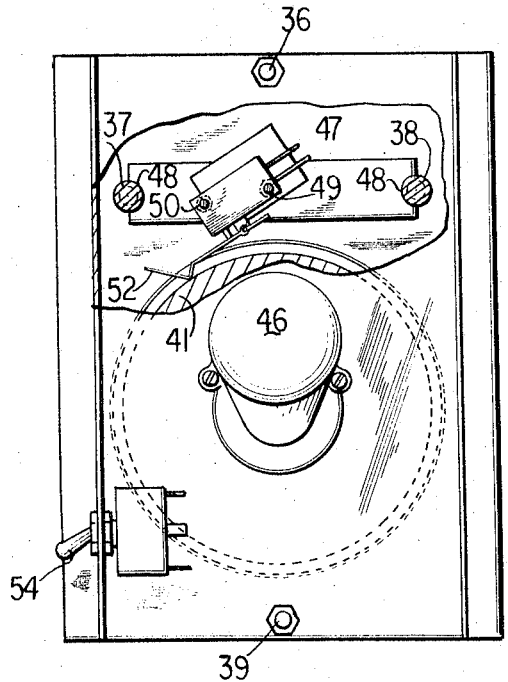
FIG. 3 is a view looking in the direction of the arrows along line 3—3 of FIG. 2, parts being broken away to show others.
Figure 4:
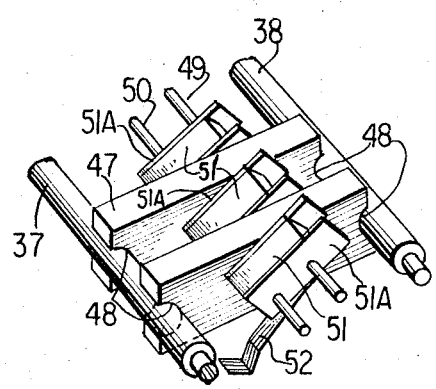
FIG. 4 is a perspective view of the switch mounting means.

Referring to FIGS. 2 and 3, the rods or bars 37 and 38 support between them a plurality of supports 47, the ends of which have semicircular grooves 48 therein that engage bars 37 and 38 and are thereby supported. There is a pair of parallel spaced rods 49, 50 (FIG. 4) that are arranged between and parallel to bars 37, 38. These rods 49, 50 support limit switches 51 in spaced relation, with thin sheets of insulating material 51A between each side of a switch 51 and its adjacent support 47, so that the switches 51 are aligned with grooves 42 in drum 41 and so that the lever 52 of each switch 51 extends into its corresponding groove 42. There is a switch 51 for each of the components referred to above, or one such switch for more than one of said components that are simultaneously energized and/or de-energized.

Figure 5:
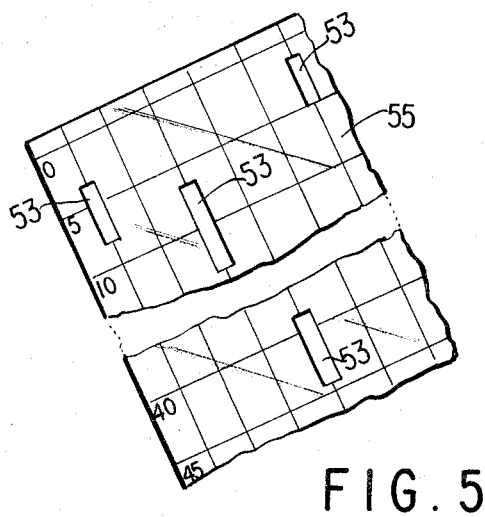
FIG. 5 is a fragment of the plastic strip containing the cut-out slots forming the program.

The program of sequential operation of the various switches is produced on a thin sheet of plastic 55 (FIG. 5) that may be of a continuous form and adapted snugly to fit the outer periphery of the drum 41. The plastic sheet 55 may have elongated slots 53 therein of a length representing the duration of the function occasioned by the closing of the corresponding switch 51.

From the foregoing it is evident that with a sheet 55 on drum 41, any desired operation of the machine may be effected manually by turning the knob 43; and upon energizing the motor 46, a desired cycle of operations may be effected automatically and in proper sequence as dictated by the slots 53 in sheet 55.

A toggle switch 54 (FIG. 3) turns on and off the timer motor 46. This provides manual operation of a selected part of the program.

Although the various features of the improved controller for laundry machines have been shown and described in detail to fully disclose one embodiment of the invention, it will be evident that changes may be made in such details and certain features may be used without others without departing from the principles of the invention.

What is claimed is:

1. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means having a plurality of axially spaced, circumferentially extending grooves; switch means mounted in cooperating position with each of said grooves, said switch means including levers that extend downwardly into the corresponding groove; and a thin sheet surrounding said drum means and including slots that are aligned with grooves in said drum means, whereby as said drum means is turned and said slots register with said levers, said levers move into said grooves, causing actuation of said switches.

2. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means having a plurality of axially spaced, circumferentially extending grooves; switch means mounted in cooperating position with each of said grooves, said switch means including levers that extend downwardly into the corresponding groove, the depth of said grooves being such that movement of said levers from within said grooves to the outer periphery thereof actuates said switches; and a thin sheet surrounding said drum means and including slots that are aligned with the grooves in said drum means, whereby as said drum means is turned and said slots register with said levers, said levers move into said grooves, causing actuation of said switches.

3. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means having a plurality of axially spaced, circumferentially extending grooves; switch means mounted in cooperating position with each of said grooves, said switch means including levers that extend downwardly into the corresponding groove; a thin sheet surrounding said drum means and including slots that are aligned with the grooves in said drum means, whereby as said drum means is turned and said slots register with said levers, said levers move into said grooves, causing actuation of said switches; a knob connected to said drum means for manually turning it; and an indicating dial for indicating which switches are closed at each rotative position of said drum means.

4. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means having a plurality of axially spaced, circumferentially extending grooves; switch means mounted in cooperating position with each of said grooves, said switch means including levers that extend downwardly into the corresponding groove; a thin sheet surrounding said drum means and including slots that are aligned with the grooves in said drum means, whereby as said drum means is turned and said slots register with said levers, said levers move into said grooves, causing actuation of said switches; and a timer motor connected to said drum means for rotating it, automatically to cause the sequential operation of said components.

5. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means having a plurality of axially spaced, circumferentially extending grooves; switch means mounted in cooperating position with each of said grooves, said switch means including levers that extend downwardly into the corresponding groove; a thin sheet surrounding said drum means and including slots that are aligned with the grooves in said drum means, whereby as said drum means is turned and said slots register with said levers, said levers move into said grooves, causing actuation of said switches; a knob connected to said drum means for manually turning it; an indicating dial for indicating which switches are closed at each rotative position of said drum means; and a timer motor connected to said drum means for rotating it, automatically to cause the sequential operation of said components.

6. In a laundry machine having a housing within which a basket is mounted for rotation, the basket being driven by an electrically operated high speed drive as well as an electrically operated low speed drive, and in which electrically operated water inlet means and water outlet means are provided, the combination therewith of a controller for sequentially operating said components comprising in combination, drum means composed of a plurality of disks having portions of different diameters to provide a plurality of axially spaced, circumferentially extending grooves; switch means mounted in cooperating position with each of said grooves, said switch means including levers that extend downwardly into the corresponding groove; and a thin sheet surrounding said drum means and including slots that are aligned with grooves in said drum means, whereby as said drum means is turned and said slots register with said levers, said levers move into said grooves, causing actuation of said switches.

References Cited by the Examiner
FOREIGN PATENTS
311,775   2/1956   Switzerland.

WILLIAM I. PRICE, *Primary Examiner.*